United States Patent
Nicholas et al.

(10) Patent No.: US 11,327,046 B2
(45) Date of Patent: May 10, 2022

(54) PH SENSING USING PSEUDO-GRAPHITE

(71) Applicants: ABB Schweiz AG, Baden (CH);
University of Idaho, Moscow, ID (US)

(72) Inventors: Nolan Nicholas, Granby, CT (US);
Ignatius Cheng, Moscow, ID (US);
Haoyu Zhu, Moscow, ID (US)

(73) Assignees: ABB SCHWEIZ AG, Baden (CH);
UNIVERSITY OF IDAHO, Moscow, ID (US)

( * ) Notice: Subject to any disclaimer, the term of this patent is extended or adjusted under 35 U.S.C. 154(b) by 325 days.

(21) Appl. No.: 16/292,320

(22) Filed: Mar. 5, 2019

(65) Prior Publication Data

US 2020/0284755 A1 Sep. 10, 2020

(51) Int. Cl.
*G01N 27/416* (2006.01)
*G01N 27/30* (2006.01)

(52) U.S. Cl.
CPC ....... *G01N 27/4167* (2013.01); *G01N 27/302* (2013.01); *G01N 27/308* (2013.01)

(58) Field of Classification Search
CPC .. G01N 27/327; G01N 27/302; G01N 27/308; G01N 27/4167; G01N 27/4168; G01N 33/543; G01N 33/1806; G01N 33/1866; H01M 8/16
See application file for complete search history.

(56) References Cited

U.S. PATENT DOCUMENTS

| | | | |
|---|---|---|---|
| 4,725,422 A | 2/1988 | Miyabayashi et al. | |
| 5,290,592 A | 3/1994 | Izuchi et al. | |
| 5,571,638 A | 11/1996 | Satoh et al. | |
| 7,442,358 B2 | 10/2008 | Sano et al. | |
| 9,691,556 B2 | 6/2017 | Cheng et al. | |
| 2005/0079119 A1 | 4/2005 | Kawakami et al. | |
| 2006/0062713 A1 | 3/2006 | Sano et al. | |
| 2006/0062715 A1 | 3/2006 | Endo et al. | |
| 2006/0121279 A1 | 6/2006 | Petrik | |
| 2007/0092432 A1 | 4/2007 | Prud'Homme et al. | |
| 2009/0068471 A1 | 3/2009 | Choi et al. | |
| 2009/0155561 A1 | 6/2009 | Choi et al. | |
| 2012/0228555 A1 | 9/2012 | Cheng et al. | |
| 2012/0304743 A1 | 12/2012 | Rajasekharan | |
| 2014/0001047 A1 | 1/2014 | Kahn et al. | |

(Continued)

FOREIGN PATENT DOCUMENTS

| | | |
|---|---|---|
| CN | 1715899 A | 4/2006 |
| CN | 107017270 A | 8/2017 |

(Continued)

OTHER PUBLICATIONS

Anderson et al., Materials Science and Engineering C, 2014, 533-537. (Year: 2014).*

(Continued)

*Primary Examiner* — Gurpreet Kaur

(74) *Attorney, Agent, or Firm* — Armstrong Teasdale LLP

(57) ABSTRACT

Methods, electrodes, and sensors for pH sensing using pseudo-graphite are disclosed. In one illustrative embodiment, a method may include coating a pseudo-graphite material onto a surface of an electrode substrate to produce a pseudo-graphite surface. The method may also include exposing the pseudo-graphite surface to a sample to measure a pH of the sample.

20 Claims, 10 Drawing Sheets

(56) References Cited

U.S. PATENT DOCUMENTS

| | | | |
|---|---|---|---|
| 2014/0111906 A1 | 4/2014 | Eilertsen | |
| 2015/0377824 A1 | 12/2015 | Ruhl et al. | |
| 2017/0008825 A1* | 1/2017 | Johnson | C07C 49/82 |
| 2017/0169959 A1 | 6/2017 | Cheng et al. | |
| 2018/0224390 A1 | 8/2018 | Pan et al. | |
| 2018/0362349 A1* | 12/2018 | Zhong | C25B 1/00 |
| 2019/0041356 A1 | 2/2019 | Pan et al. | |
| 2019/0079043 A1* | 3/2019 | Johnson, Jr. | G01N 27/302 |
| 2020/0284747 A1 | 9/2020 | Nicholas et al. | |
| 2020/0284748 A1 | 9/2020 | Nicholas et al. | |
| 2020/0284749 A1 | 9/2020 | Nicholas et al. | |
| 2020/0284750 A1 | 9/2020 | Nicholas et al. | |
| 2020/0284751 A1 | 9/2020 | Nicholas et al. | |
| 2020/0284755 A1 | 9/2020 | Nicholas et al. | |

FOREIGN PATENT DOCUMENTS

| | | |
|---|---|---|
| EP | 0165047 A2 | 12/1985 |
| JP | 2017027919 A | 2/2017 |
| KR | 20100118808 A | 11/2010 |
| KR | 1020110069458 A | 6/2011 |
| RU | 2163375 C2 | 2/2001 |
| WO | 1998/020331 A1 | 1/1998 |
| WO | 2001/064938 A2 | 9/2001 |
| WO | 2002/082069 A1 | 10/2002 |
| WO | 2014116026 A1 | 7/2014 |

OTHER PUBLICATIONS

Carbon, 144, 2019, 831-840 (Year: 2019).*

Minhua Shao et al., "Recent Advances in Electrocatalysts for Oxygen Reduction Reaction," Chemical Reviews, vol. 116(6), Feb. 17, 2016, pp. 3594-3657.

Andrew A. Gewirth et al., "Nonprecious Metal Catalysts for Oxygen Reduction in Heterogeneous Aqueous Systems," Chemical Reviews, vol. 118(5), Jan. 31, 2018, pp. 2313-2339.

Subal Dey et al, "Molecular electrocatalysts for the oxygen reduction reaction," Nature Reviews Chemistry, vol. 1(98), Dec. 6, 2017, pp. 1-20.

Olga Naumov et al., "The stability limits of highly active nitrogen doped carbon ORR nano-catalysts: a mechanistic study of degradation reactions," Nanoscale, vol. 10(14), Mar. 1, 2018, pp. 6724-6733.

Yanguang Li et al., "Metal-Air Batteries: Will They Be the Future Electrochemical Energy Storage Device of Choice?," ACS Energy Letters, vol. 2(6), May 5, 2017, pp. 1370-1377.

Bin Xu et al., "Modification of vertically aligned carbon nanotubes with RuO2 for a solid-state pH sensor," Electrochimica Acta, vol. 55(8), Mar. 1, 2010, pp. 2859-2864.

Tong-Shen Liu et al., "Au—Fe(III) nanoparticle modified glassy carbon electrode for electrochemical nitrite sensor," Journal of Electroanalytical Chemistry, vol. 632(1-2) Jul. 1, 2019, pp. 197-200.

Kristin R. Kneten et al., "Effects of Redox System Structure on Electron-Transfer Kinetics at Ordered Graphite and Glassy Carbon Electrodes," Analytical Chemistry, vol. 64(21), Nov. 1, 1992, pp. 2518-2524.

Claudia C. Villarreal et al., "Carbon allotropes as sensors for environmental monitoring," Current Opinion in Electrochemistry, vol. 3(1), Jun. 2017, pp. 106-113.

Kevin W. Hathcock et al., "Incipient Electrochemical Oxidation of Highly Oriented Pyrolytic Graphite: Correlation between Surface Blistering and Electrolyte Anion Intercalation," Analytical Chemistry, vol. 67(13), Jul. 1, 1995, 2201-2206.

Paul K. Chu et al., "Characterization of amorphous and nanocrystalline carbon films," Materials Chemistry and Physics, vol. 96(2-3), Apr. 10, 2006, pp. 253-277.

Isaiah O. Gyan et al., "A Study of the Electrochemical Properties of a New Graphitic Material: GUITAR," ChemElectroChem, vol. 2(5), Feb. 12, 2015, pp. 700-706.

Zhen Yuan Xia et al., "Synergic Exfoliation of Graphene with Organic Molecules and Inorganic Ions for the Electrochemical Production of Flexible Electrodes," ChemPlusChem, vol. 79(3), Jan. 29, 2014, pp. 439-446.

"Carbon Nanotube | Purity | Evaluation of Purity and Heat Resistance," Schmadzu, online at https://www.shimadzu.com/an/industry/ceramicsmetalsmining/0102005.html, downloaded Oct. 10, 2019, 4 pages.

B. Rösner et al., "Dispersion and characterization of arc discharge single-walled carbon nanotubes—towards conducting transparent films," Nanoscale, vol. 6(7), Jan. 14, 2014, pp. 3695-3703.

So Yeun Kim et al., "Facile Synthesis of Carbon-Coated Silicon/Graphite Spherical Composites for High-Performance Lithium-Ion Batteries," ACS Applied Materials & Interfaces, vol. 8(19), Apr. 26, 2016, pp. 12109-12117.

Konstantinos Spyrou et al., "A novel route towards high quality fullerene-pillared graphene," Carbon, vol. 61, Sep. 2013, pp. 313-320.

Jarmila Vilčáková et al., "Effect of Surfactants and Manufacturing Methods on the Electrical and Thermal Conductivity of Carbon Nanotube/Silicone Composites," Molecules, vol. 17(11), Nov. 5, 2012, pp. 13157-13174.

Shuai Chen et al., "Branched CNT@SnO2 nanorods@carbon hierarchical heterostructures for lithium ion batteries with high reversibility and rate capability," Journal of Materials Chemistry A, vol. 2(37), Jul. 22, 2014, pp. 15582-15589.

Franco Cataldo, "A Study on the Thermal Stability to 1000° C. of Various Carbon Allotropes and Carbonaceous Matter Both Under Nitrogen and in Air," Fullerenes, Nanotubes and Carbon Nanostructures, vol. 10(4), Dec. 2002, pp. 293-311.

Xin Li et al., "Fabrication of ZnO nanowires array with nanodiamond as reductant," RSC Advances, vol. 6(99), Sep. 27, 2016, pp. 96479-96483.

Reeti Bajpai et al., "Rapid growth of onion-like carbon nanospheres in a microwave oven," CrystEngComm, Nov. 13, 2015, vol. 18(2), pp. 230-239.

R.I.R. Blyth et al., "XPS studies of graphite electrode materials for lithium ion batteries," Applied Surface Science, Oct. 16, 2000, vol. 167(1-2), pp. 99-106.

Jessica Campos-Delgado et al., "Bulk Production of a New Form of sp2 Carbon: Crystalline Graphene Nanoribbons," Nano Letters, Aug. 14, 2008, vol. 8(9), pp. 2773-2778.

Frank Cheng, "GUITAR: A New Material for Dimensionally Stable Anodes," Seminar Given to Washington State University Department of Civil and Environmental Engineering, May 2012, published online at https://www.webpages.uidaho.edu/ifcheng/recent_seminars_and_presentation.htm, 96 pages.

Frank Cheng et al., "GUITAR: A New Material for Dimensionally Stable Anodes," Paper No. 19649, 244th American Chemical Society National Meeting, Philadelphia, PA, Aug. 2012, published online at https://www.webpages.uidaho.edu/ifcheng/recent_seminars_and_presentation.htm, 69 pages.

I. Francis Cheng et al., "Highest measured anodic stability in aqueous solutions: graphenic electrodes from the thermolyzed asphalt reaction," RSC Advances, Feb. 21, 2013, vol. 3(7), pp. 2379-2384.

I. Francis Cheng et al., "Synthesis of graphene paper from pyrolyzed asphalt," Carbon, Jul. 2011, vol. 49(8), pp. 2852-2861.

Henriette Estrade-Szwarckopf, "XPS photoemission in carbonaceous materials: A "defect" peak beside the graphitic asymmetric peak," Carbon, Dec. 2004, vol. 42(8-9), pp. 1713-1721.

Yuqun Xie et al., "Sulfur as an important co-factor in the formation of multilayer graphene in the thermolyzed asphalt reaction," Journal of Materials Chemistry, Mar. 28, 2012, vol. 22(12), pp. 5723-5729.

Isaiah O. Gyan et al., "Supporting Information: A Study of the Electrochemical Properties of a New Graphitic Material: GUITAR," ChemElectroChem, 2015, 12 pages.

Isaiah O. Gyan et al., "Electrochemical Study of Biologically Relevant Molecules at Electrodes Constructed from GUITAR, a New Carbon Allotrope," Microchemical Journal, vol. 122, pp. 39-44, Apr. 8, 2015.

ISA/RU, International Search Report and Written Opinion for Related PCT International Patent Application No. PCT/US2020/021130, dated Jun. 18, 2020, 8 pages.

(56) References Cited

OTHER PUBLICATIONS

ISA/RU, International Search Report and Written Opinion for Related PCT International Patent Application No. PCT/US2020/021137, dated Jun. 18, 2020, 8 pages.

ISA/RU, International Search Report and Written Opinion for Related PCT International Patent Application No. PCT/US2020/021145, dated Jun. 18, 2020, 8 pages.

ISA/RU, International Search Report and Written Opinion for Related PCT International Patent Application No. PCT/US2020/021149, dated Jun. 11, 2020, 6 pages.

Humayun Kabir et al., "The sp2-sp3 carbon hybridization content of nanocrystalline graphite from pyrolyzed vegetable oil, comparison of electrochemistry and physical properties with other carbon forms and allotropes," Carbon, vol. 144, Apr. 2019, pp. 831-840.

\* cited by examiner $E_{1/2}$ = CONSTANT - 0.0592 pH

|  | PRISTINE GUITAR | q-GUITAR | q-GUITAR PREVIOUS WORK[7] |
|---|---|---|---|
| C=C/C-C | 284.2 EV (C=C, 85%) | 284.5 EV (66.4%) | 284.5 EV (59.0%) |
|  | 285.4 EV (C=C, 15%) |  |  |
| C-O-C/C-OH | XPS WIDE SCAN INDICATES NO OXYGEN CONTENT | 285.9 EV (17.5%) | 286.1 EV (19%) |
| C=O |  | 287.4 EV (9.1%) | 287.4 EV (11.8%) |
| COOH |  | 288.8 EV (7.0%) | 288.8 EV (10.2%) |

*FIG. 8*

| QUINOID MOIETY ACTIVATION OR ATTACHMENT METHOD | ELECTRODE | SLOPE mV/pH | pH LINEAR RANGE | STABILITY | pH DETECTION METHOD | REF |
|---|---|---|---|---|---|---|
| N/A | COMMERCIAL GLASS ELECTRODE | 53.2 TO 63.1 | 2 TO 12 | | POTENTIOMETRIC | 46 |
| ANODIZATION METHODS | GUITAR | $63.3 \pm 1.1$ (n=5) | 0 TO 11 | 20 AND MORE TESTS FOR pH 0-9; 2 TESTS FOR pH 0-11 | SWV/REDUCTION | THIS WORK |
| | CARBON FIBER | $52 \pm 2$ (n=4) | 3 TO 9 | 24 TESTS IN pH 7 | SWV/OXIDATION | 33 |
| | CARBON PASTE | 60 | 3 TO 8 | N/A | POTENTIOMETRIC | 39 |
| ELECTRODE POLISHING METHODS | GLASSY CARBON | 60 | 2 TO 5 | 4 TESTS IN pH 7 | SWV/OXIDATION | 44 |
| | EDGE PLANE PYROLYTIC GRAPHITE | $57 \pm 1$ | 1 TO 13 | SINGLE TEST NEED REACTIVATION | SWV/REDUCTION | 17 |
| | GLASSY CARBON | 59 | 1 TO 13 | SINGLE TEST NEED REACTIVATION | SWV/REDUCTION | 26 |
| CHEMICAL OXIDATION METHODS | BORON DOPED DIAMOND | $59 \pm 1$ | 2 TO 12 | MORE THAN 12 TESTS IN pH=2.85 | SWV/REDUCTION | 27 |
| | GRAPHITE INK | 57 | 1 TO 13 | SINGLE TEST | SWV/REDUCTION | 34 |
| COVALENT ATTACHMENT METHODS | CARBON FIBER | 38 | 6.5 TO 8.0 | 45000 TESTS IN pH 7.5 | CV/OXIDATION | 32 |
| | MULTI WALL CARBON NANOTUBES | 59.3-60.2 | 1 TO 12 | 500 TESTS IN pH 6.8 | SWV/REDUCTION AND OXIDATION | 47 |
| PHYSICAL ADSORPTION METHODS | PYROLYTIC CARBON COATED QUARTZ NANOPIPETTE | 54 | 2 TO 12 | N/A | CV/MID PEAK | 16 |
| CHEMICAL ADSORPTION METHODS | Au COATED CARBON FIBER | 58 | 5.8 TO 8 | 1000 TESTS IN pH 7.4 | CV/MID PEAK | 20 |
| COMPOSITE ELECTRODES | CARBON PASTE ELECTRODE | 60.2 | 0 TO 7 | N/A | SWV/OXIDATION | 43 |
| | | 60 | 0 TO 9 | 500 TESTS IN pH 4,7,9 | SWV/OXIDATION | |
| | | 59.7-62.0 | 2 TO 11 | N/A | CV/OXIDATION | 48 |
| | | 55.8 | 2 TO 10 | | | 49 |

*FIG. 13*

PH SENSING USING PSEUDO-GRAPHITE

CROSS-REFERENCE TO RELATED APPLICATIONS

This application is related to U.S. patent application Ser. No. 16/292,317 (titled "Chemical Oxygen Demand Sensing Using Pseudo-Graphite"), Ser. No. 16/292,318 (titled "Chlorine Species Sensing Using Pseudo-Graphite"), Ser. No. 16/292,322 (titled "Technologies Using Pseudo-Graphite Composites"), Ser. No. 16/292,323 (titled "Technologies Using Nitrogen-Functionalized Pseudo-Graphite"), and Ser. No. 16/292,325 (titled "Technologies Using Surface-Modified Pseudo-Graphite"), all of which were filed on Mar. 5, 2019, by the co-applicants of the present application. The disclosures of the foregoing patent applications are all incorporated herein by reference in their entirety.

BACKGROUND

The present disclosure relates to pH sensing using pseudo-graphite, and more particularly to the utilization of pseudo-graphite electrodes for sensing pH.

Generally, some electrodes in a sensor are capable of measuring pH in a liquid. The electrodes may be utilized to measure pH in the liquid by applying an electrical potential through the electrode and measuring a resultant signal. However, most pH-measuring electrodes have high cost and low performance. Additionally, the electrode performance may be reduced due to fouling of the electrode or environmental interferences.

SUMMARY

The present disclosure includes one or more of the features recited in the appended claims and/or the following features which, alone or in any combination, may comprise patentable subject matter.

According to one aspect of the disclosed embodiments, a method may include coating a pseudo-graphite material onto a surface of an electrode substrate to produce a pseudo-graphite surface. The method may also include exposing the pseudo-graphite surface to a sample to measure a pH of the sample.

In some embodiments, the method may also include modifying the pseudo-graphite surface with an electrochemically sensitive chemistry to alter a sensing property of the electrode to enhance the electrode for pH measurement. The method may include attaching oxygen-based chemistries to the pseudo-graphite surface to enhance the electrode for pH measurement. The method may include attaching the oxygen-based chemicals through in-situ oxidation. The method may include applying an oxidizing electrical potential to the pseudo-graphite surface.

In some embodiments, the method may include measuring pH with the electrode through at least one of square wave voltammetry or sweep voltammetry. The method may include measuring pH with the electrode through open circuit potential. The method may include measuring pH with the electrode in conjunction with localized pH modulation.

In some embodiments, the pseudo-graphite may have fast heterogeneous electron transfer at a basal plane. The pseudo-graphite may have a corrosion resistance greater than graphitic materials. A carbon content of the pseudo-graphite may include 80-90% sp2 carbon and 10-20% sp3 carbon.

According to another aspect of the disclosed embodiments, an electrode may include an electrode substrate with a surface. A pseudo-graphite material may be coated onto the surface of the electrode substrate to produce a pseudo-graphite surface for pH measurement.

In some embodiments, the pseudo-graphite may be modified with an electrochemically sensitive chemistry to alter a sensing property of the electrode to enhance the electrode for pH measurement. Oxygen-based chemistries may be attached to the pseudo-graphite surface to enhance the electrode for pH measurement. The oxygen-based chemistries may be attached through in-situ oxidation. The oxidizing electrical potential may be applied to the pseudo-graphite surface to attach the oxygen-based chemistries.

In some embodiments, the pseudo-graphite may have a fast heterogeneous electron transfer at a basal plane. The pseudo-graphite may have a corrosion resistance greater than graphitic materials. A carbon content of the pseudo-graphite may include 80-90% sp2 carbon and 10-20% sp3 carbon.

According to yet another aspect of the disclosed embodiments, a sensor may include an electrode. An electrical source may supply at least one of a current or voltage to the electrode. A measurement circuit may measure a resultant signal from the electrode. The electrode may include an electrode substrate with a surface. A pseudo-graphite material may be coated onto the surface of the electrode substrate to produce a pseudo-graphite surface. The pseudo-graphite surface may be modified with an electrochemically sensitive chemistry to alter a sensing property of the electrode to enhance the electrode for pH measurement.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which:

FIG. 8 is a table of the results of the deconvolution of the XPS C 1s peak of pristine pseudo-graphite and q-pseudo-graphite;

FIG. 13 is a table of a voltammetric pH sensor literature summary.

DETAILED DESCRIPTION OF THE DRAWINGS

Figure 1:
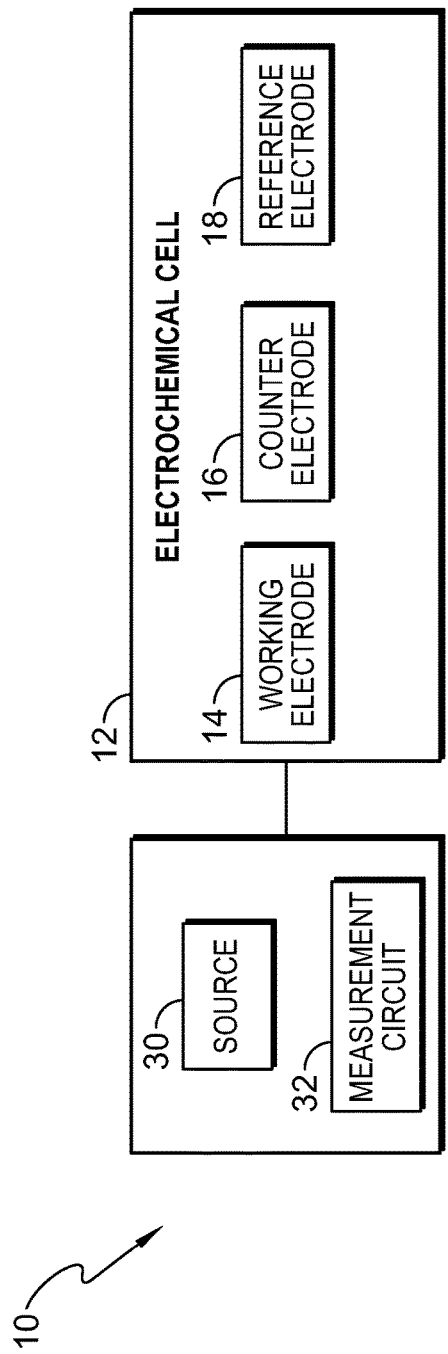
FIG. 1 is a simplified block diagram of a sensor device in accordance with an embodiment.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring to FIG. 1, in one illustrative embodiment, a sensor device 10 includes an electrochemical cell 12 configured to be positioned within a liquid having a chemical species. The electrochemical cell 12 houses a working electrode 14, a counter electrode 16, and a reference electrode 18. In some embodiments, the electrochemical cell 12 only houses the working electrode 14 and the counter electrode 16, and does not include a reference electrode 18. In other embodiments, the reference electrode 18 and working electrode 14 may be combined into a single electrode. The working electrode 14 is electrically coupled to a source 30. The source 30 may be a current source or a voltage source. Each electrode 14, 16, 18 is coupled to a measuring circuit 32 that is configured to measure current or voltage, depending on the type of source 30.

In an embodiment where the source 30 is a current source, the source 30 applies a known current to the working electrode 14. The measuring circuit 32 detects a resultant current between the working electrode 14 and the counter electrode 16. By comparing the resultant current to a current at the reference electrode 18, a concentration of chemical species in the liquid may be detected.

In an embodiment where the source 30 is a voltage source, the source 30 applies a known voltage to the working electrode 14 that is held at a controlled potential relative to a reference. The measuring circuit 32 detects a resultant voltage or current between the working electrode 14 and the counter electrode 16. By comparing the resultant voltage to a voltage at the reference electrode 18, a concentration of chemical species in the liquid may be detected.

Figure 2:
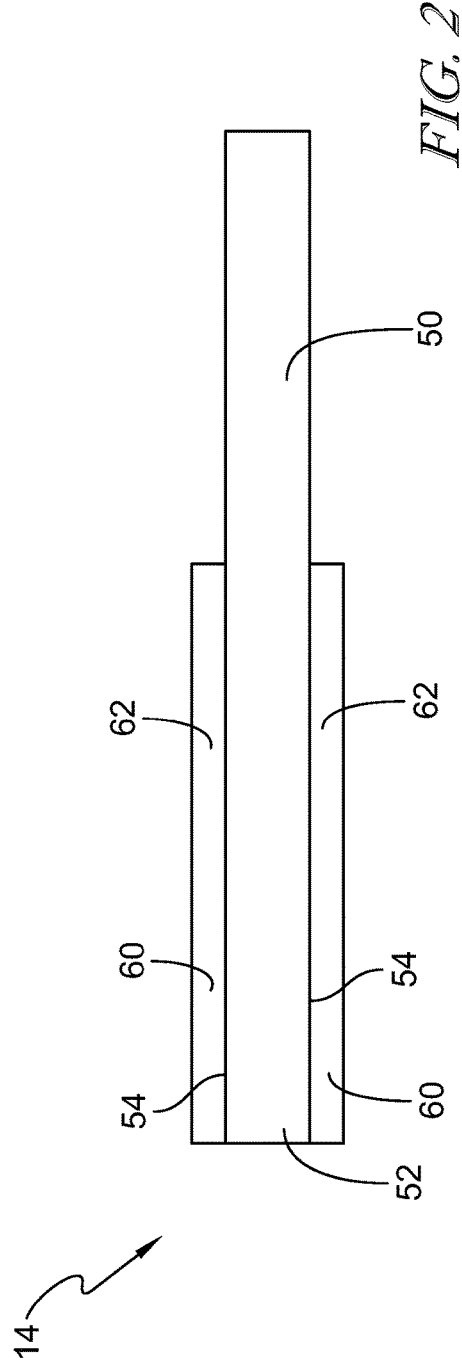
FIG. 2 is a cross-sectional view of the working electrode shown in FIG. 1.

Referring now to FIG. 2, in one illustrative embodiment, the working electrode 14 includes a substrate 50 having at least one surface 52 with a coatable surface 54. In some embodiments, the electrode 14 is a composite electrode. The coatable surface 54 may be selected from at least one of nanosprings, nanotubes, diatomites, a metal, glass, mica, germanium, and silicon (including porous high surface area electrochemically etched silicon). The metal may be selected from copper or iron. The coatable surface 54 may possess suitable thermal stability, chemical stability at fabrications temperatures and surface chemistry to have a pseudo-graphite applied thereon. The coatable surface 54 may also have relatively low thermal expansion between the deposition conditions and room temperature. For synthesis/fabrication purposes this includes stable ceramics such as $SiO_2$ (which includes micro- and nano-sized structures such as nanosprings and diatomites), as well as other ceramics like $Al_2O_3$ (including halloysite and anodized aluminum oxide membranes), MgO, iron oxides, silicon, cenospheres, and the like. It also includes suitable carbons such as graphite fibers and carbon black and some high temperature tolerant metals such as tungsten and molybdenum. A pseudo-graphite 54 is coated onto the surface 52 of the substrate 50. The illustrative embodiment shows the pseudo-graphite 54 coated on two surfaces 52 of the substrate 50. In some embodiments, the pseudo-graphite is only coated on a single surface 52 of the substrate 50. In some embodiments, the pseudo-graphite 54 is coated around the substrate 50. As discussed further below, the pseudo-graphite 54 may be modified with an electrochemically sensitive material 62 to alter a sensing property of the electrode 14 to enhance the electrode 14 for pH detection.

As used in the present disclosure, "pseudo-graphite" refers to an allotrope of carbon that is graphite-like, but that has one or more improved properties as compared to graphite and to graphene. These improved properties may include fast heterogeneous electron transfer (HET) at a basal plane of the pseudo-graphite and/or corrosion resistance greater than graphite and graphene. In some embodiments, the pseudo-graphite may be a nanocrystalline-graphite that is in Stage-2 of Ferrari's amorphization trajectory between amorphous carbon and graphite. In some embodiments, the pseudo-graphite has a nanocrystallite size of 1.5 nm, as inferred from Scherrer's law by X-Ray Diffraction (XRD) measurements. The pseudo-graphite may have a layered morphology but, in contrast to graphites and graphenes, has a resistance to monolayer exfoliation. Instead, pseudo-graphite typically exfoliates in thick films of several hundred monolayers at a time.

In some embodiments, the pseudo-graphite may have a sp2/sp3 carbon ratio of about 85/15. In other embodiments, the carbon content of the pseudo-graphite may include between 80-90% sp2 carbon and 10-20% sp3 carbon. In still other embodiments, the carbon content of the pseudo-graphite may include between 75-95% sp2 carbon and 5-25% $sp^3$ carbon. By contrast, typical graphites and graphenes both are near 100% sp2 carbon. For clarity, the pseudo-graphite can contain additional elements besides carbon. For instance, some pseudo-graphites include about 11 atomic % hydrogen.

The appearance of pseudo-graphite may be similar to a crystalline graphite but differs in that both the basal and edge planes (EP) have facile heterogeneous electron transfer (HET) kinetics. The basal plane (BP) of graphites have a barrier to HET as these materials are zero-band gap semiconductors. On the other hand, structural defects within the molecular planes of BP pseudo-graphite may increase density of electronic states (DOS) near the Fermi-level with corresponding HET rates. With the $Fe(CN)_6^{3-/4-}$ redox probe, BP and EP pseudo-graphite have achieved a standard HET rate ($k^0$) of $10^{-2}$ cm/s. Other distinguishing features can include slow hydrogen evolution kinetics and/or molecular planes that are resistant to sub-surface electrolyte intercalation, making the pseudo-graphite more resistant to corrosion than graphites and graphenes. These features can provide a wide electrochemical potential window of approximately 3 V defined as the potential window at 200 $\mu A/cm^2$ in 1 M $H_2SO_4$, which surpasses other sp2 carbon electrodes by 1 V and provides pseudo-graphite similar properties to boron-doped diamond.

Illustrative examples of "pseudo-graphite," and methods of producing such materials, are disclosed in each of U.S. Pat. No. 9,691,556, U.S. Patent Application Publication No. 2012/0228555, and Humayun Kabir et al., "The sp2-sp3 carbon hybridization content of nanocrystalline graphite from pyrolyzed vegetable oil, comparison of electrochemistry and physical properties with other carbon forms and allotropes," published in Carbon, volume 144, pages 831-840. The entire disclosures of each of the foregoing references are incorporated herein by reference.

While the pseudo-graphite 54 itself possesses many advantageous electrochemical properties, modifying the pseudo-graphite 54 with other chemical groups may improve the range of functionality and efficacy of the pseudo-graphite 54 for various applications. Such functionalization can provide improved electrode characteristics for a variety of applications. One such type of application is the sensing of pH.

Figure 3:
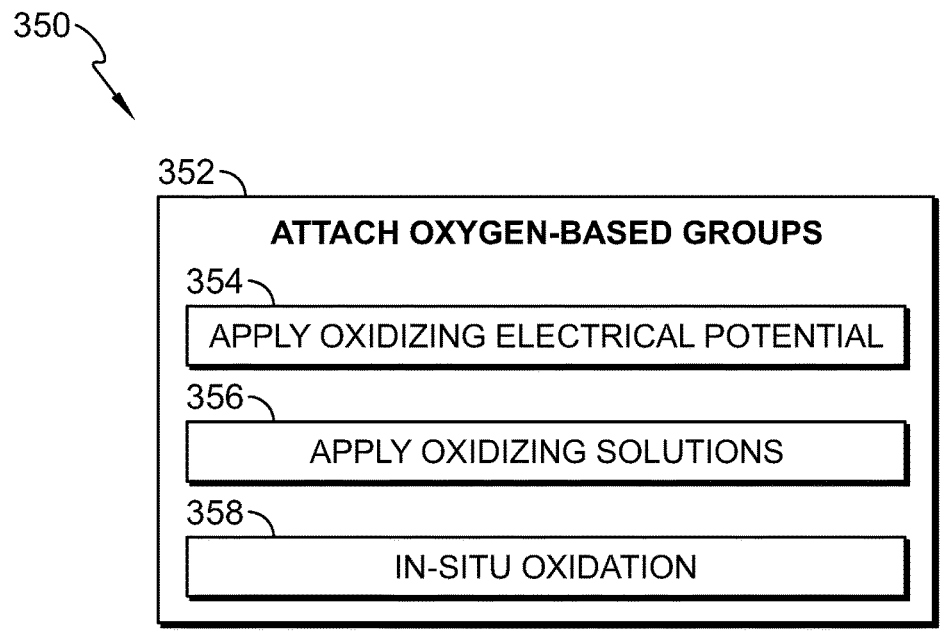
FIG. 3 is a simplified flowchart of a method for modifying the pseudo-graphite surface for measuring pH.

Referring now to FIG. 3, a method 350 for functionalizing the pseudo-graphite 54 includes adding chemical groups to the pseudo-graphite 54. Exemplary functionalization includes forming oxygen-based groups (such as quinone-like groups), at block 352. At block 354, oxygen-based groups are formed by applying an oxidizing electrical potential to the pseudo-graphite 54 in contact with a suitable electrolyte system. At block 356, oxygen-based groups are formed by applying oxidizing solutions of sufficient oxidizing strength such as peroxides, ozone, chlorate, Caro's acid, piranha solutions, Hummer's solutions, meta-chloroperbenzoic acid and the like to the pseudo-graphite 54. For instance, pseudo-graphite may be bulk oxidized by dispersing 0.05 g psuedo-graphite-on-diatomite particles into 5 ml of dichloromethane along with 0.025 g of meta-chloroperbenzoic acid and allowing the system to react at room temperature with continuous stirring for 24 hours. At block 358, oxygen-based groups are formed through in-situ oxidation processes, such as application of a strong oxidizing potential to the pseudo-graphite 54. In some cases such an in-situ oxidation process may be conducted as a substantially cyclically applied potential, which may possess both oxidizing and reducing features to more fully remove various types of contaminants and finish with a surface which is oxidized to provide suitable pH sensing surface groups. In some embodiments, in-situ oxidation process may be used to clean/defoul the pseudo-graphite 54.

Figure 4:
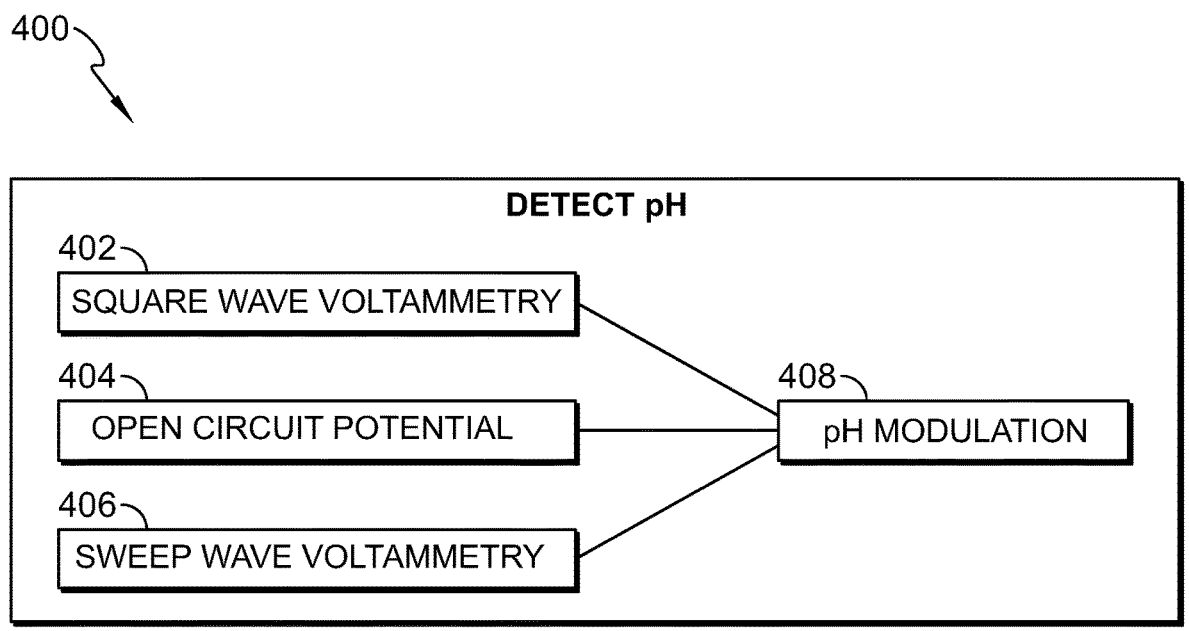
FIG. 4 is a simplified flowchart of a method of measuring pH using the sensor device shown in FIG. 1.

Referring to FIG. 4, a method 400 is provided for measuring pH through a variety of electrochemical techniques. At block 402, pH is measured utilizing square wave voltammetry (SWV). For example, a square wave potential is applied to the working electrode 14 relative to one or more counter electrodes 16 and often referenced to a stable reference electrode 18. The position of the peak of the square wave is indicative of the pH of the solution for such pH active redox groups. At block 404, pH is measured utilizing open circuit potential. For example, the steady state potential of the working electrode 14 is measured with respect to one or more additional electrodes, such as native or functionalized pseudo-graphite electrodes or other potential-stable electrodes such as a reference electrode. The steady state potential is measured through various methods, such as electrometer devices, etc. At block 406, pH is measured utilizing sweep voltammetry, e.g. cyclic, and/or linear. For example, a potential is applied which is ramped over time between the working electrode 14 and one or more counter electrodes 16 and often referenced to a stable reference electrode 18. At block 408, pH is measured utilizing localized pH modulation, e.g., electrochemical modulation. For example, in addition to at least one of the measurements described above, a secondary nearby electrode or electrodes may be used to modulate the local pH in proximity of the working electrode 14. That is, a pseudo-graphite or boron doped diamond electrode may be used to modulate the local pH through an impressed electrical current. Locally modulating the pH using a known amount of electrical energy and measuring how much the pH changes may be utilized as an alternative referencing method for measuring the system pH. The techniques described above may be used separately or in combination.

In some embodiments, the reference electrode 18 will be applied to enable accurate and stable reading of the electrochemical peak position, and thereby the pH. The reference electrode 18 may include various types of electrode designs such as are common in the art including SCE, Ag/AgCl and/or similar electrodes. Such reference electrodes 18 may include the deposition of redox active materials and/or the binding of redox active referencing groups onto the surface of a pseudo-graphite electrode. For example, redox active nanoparticles such as Ag/AgCl, AgCl or CeO2-x nanoparticles may be deposited onto the surface to provide a pH insensitive redox couple, which can be utilized to provide pseudo-reference functionality. Alternatively or additionally, ferrocenic moieties may be tethered to the pseudo-graphite 54 to provide a pH insensitive redox couple, which can be utilized to provide a stable reference electrode functionality.

In some embodiments, the surface moieties include oxidized pseudo-graphite, wherein pseudo-graphite is placed into an environment conducive to oxidation, e.g. 1M sulfuric acid, and an anodizing potential process, e.g. 1.8V-2.5V vs. Ag/AgCl for approximately 1.5 minutes followed by cyclic voltammetry scans between 1.0V to −0.7V with a scan rate of 50 mV/s (approximately 30 scans), is applied to the pseudo-graphite. Various forms of anodic potentials may be utilized including constant voltage conditions, constant current conditions, and applied square-waves, ramps, and cycles. The specific conditions applied including chemical environment and oxidizing potentials may be used to tune the type and density of surface functional groups produced. Similarly, other conditions may be used to produce such oxidation such as the use of less aggressive conditions, e.g. 0.1 M Na2SO4 with 1.8V applied for 1.5 minutes followed by cyclic voltammetry scans between 1.0V to −0.7V (approximately 30 scans). This process similarly produces oxidized groups on the pseudo-graphite 54, but generally with substantially lower surface coverage of oxygen-bearing groups. Alternatively, the pseudo-graphite electrode may be oxidized by other methods such as exposing the pseudo-graphite to an oxidizing chemical environment typically for an extended period of time, for example a percarbonate solution (e.g. 10% w/v Na2CO3/H2O2, with available H2O2 20-30%) for several days.

In some embodiments, device 10 includes one or more working electrodes 14, one or more counter electrodes 16, and, optionally, one or more referencing electrodes 18 constructed as part of a single array of electrodes on a single substrate.

In some embodiments the pH sensitive surface chemistry and pH insensitive reference redox chemistry may be grafted onto the same electrode. For example, the pseudo-graphite 54 may be partially oxidized and then grafted with a ferrocenic moiety.

In an experiment, voltammetric pH sensing was conducted with an oxidized form of pseudo-graphite. This modification creates a surface rich of quinoid whose square voltammetric peak potential shifts by −63.3 mV/pH over the range of pH 0 to 11. The response is robust with up to 20 voltammetric runs between pH 0-9 and 2 between pH 10-11. There is no reactivation required between voltammetric scans. Cyclic voltammetric analysis reveals that the surface concentration of quinoid is $2.7 \times 10^{-9}$ mol/cm$^2$, which ranks as the highest in literature on the basal plane of a graphite-like material. X-ray photoelectron spectroscopy studies confirm this high concentration of oxygen at the basal plane. Further studies indicate that this voltammetric pH sensor is free of interference from Na$^+$ and K$^+$ and from the oxygen reduction reaction. The experiment facilitated rapid and simple electrode preparation, wide pH sensing range 0 to 11, with a sensitivity of 63.3 mV/pH, no reactivation required between successive scans, and showed that dissolved O$_2$ reduction reaction and Na$^+$/K$^+$ are not interferences.

Figure 5:
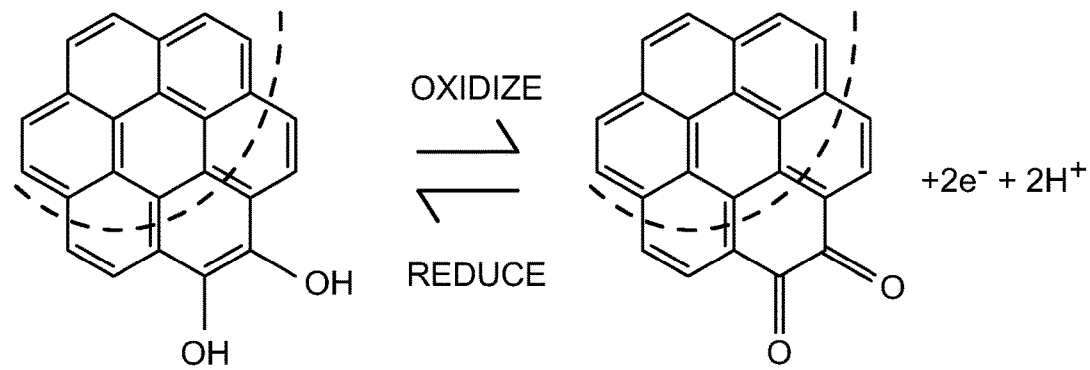
FIG. 5 illustrates the mechanism of quinoid/hydroquinoid redox reaction on graphitic electrode and the Nernstian response equation.

The scheme in FIG. 5 illustrates the possibility of sensing pH through proton-redox-activated pseudo-graphite functionalities. Most of these species are thought to be quinoid species, accordingly, proton-redox-activated pseudo-graphite is abbreviated herein as q-pseudo-graphite. The cyclic voltammetric half-wave potential ($E_{1/2}$) on these functional groups offers a theoretical linear shift of 59.2 mV per pH unit. In some embodiments, the linear shift is higher than 59.2 mV per pH unit, for example, 80 mV per pH unit. This approach has been investigated on carbon electrodes by various preparation methods. In most instances, the modification process may be time consuming, require re-activation between pH determinations and/or the use of hazardous materials. The method to form q-pseudo-graphite is rapid, and generally takes less than 20 minutes in 1M sulfuric acid. The pH sensing capabilities of this modified material were examined.

Nitrogen gas (>99.5%), sulfuric acid (96.3%), acetic acid (glacial), sodium bicarbonate (powder), potassium nitrate (crystal), sodium chloride (crystalline), boric acid, sodium hydroxide, sodium carbonate, phosphoric acid, standardized nitric acid (1.0 M), TRIS hydrochloride, copper alligator clips, paraffin wax, and glass pH combination electrodes were obtained. All aqueous solutions were prepared with deionized water passed through an activated carbon purification cartridge. Solutions used for pH detection were standardized 1.0 M HNO$_3$, and 0.10 M HNO$_3$ (titrated with 0.10 M NaOH standardized with dried KHP), Britton-Robinson Buffer system (pH=2-9, 0.04M phosphoric acid, 0.04M acetic acid and 0.04 boric acid mixture, pH adjusted with 0.2M NaOH), 0.1M carbonate-bicarbonate buffer (pH=10-11). The supporting electrolyte for pH 1-11 buffers was 0.1M KNO$_3$. For interference studies, pH of 0.1M TRIS was adjusted by 0.1M TRIS hydrochloride in place of the Britton-Robinson buffer at pH=5.5, 7 and 9 with no supporting electrolyte.

Pseudo-graphite samples were synthesized, and electrode fabrication and geometric area isolation were performed. All electrochemical studies were conducted in a three-electrode undivided cell with graphite rod counter electrode and Ag/AgCl/3M NaCl (aq) (0.209 V vs SHE) reference electrode. Cyclic voltammetry (CV) and square wave voltammetry (SWV) were carried out using a potentiostat. All the SWVs in this work were collected with a step potential of 4 mV, a potential amplitude of 20 mV and a frequency of 25 Hz.

The X-ray photoelectron spectroscopy (XPS) was performed in a custom built vacuum chamber with a base pressure of $5 \times 10^{-10}$ torr. Measurements were acquired with the Al K$\alpha$ emission line (1486.6 eV) and a hemispherical energy analyzer with a resolution of 25 meV. Spectra were acquired with as prepared samples and at room temperature. The XPS peaks were fitted to the Gaussian curve, after performing a Shirley background subtraction, where the FWHM of all the fitted peaks were held at the same value.

Figure 6:
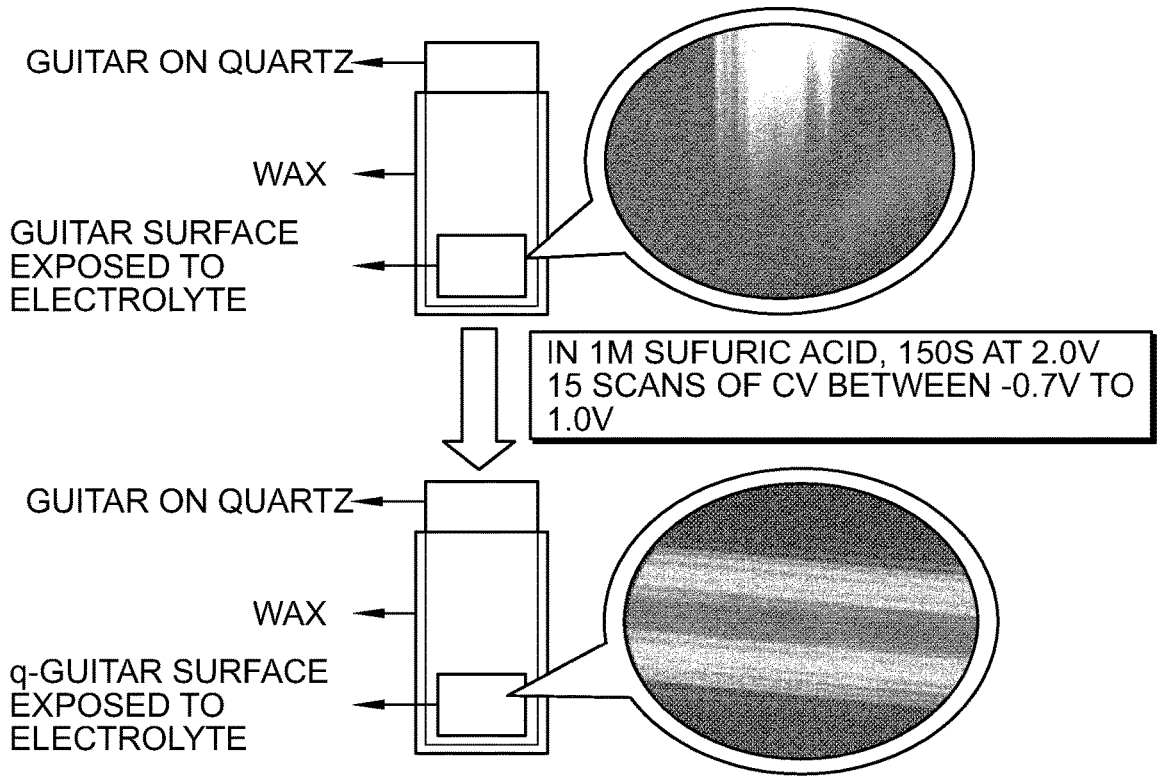
FIG. 6 is a diagram of electrode preparation and formation of a q-pseudo-graphite pH sensor.

The formation of quinone-like functional groups on pseudo-graphite was conducted by applying 2.0 V vs. Ag/AgCl for 150 seconds followed by 15 cyclic voltammetric scans from −0.7 V to 1.0 V to −0.7V with scan rate of 50 mV/s in 1M sulfuric acid. This changed the metallic sheen of pseudo-graphite to a yellowish brown (FIG. 6). On anodized glassy carbon and related materials, this feature is attributed to a thin oxidized layer causing an optical interference. It is important to note that glassy carbon is an edge plane type electrode.

Figures 7A, 7B:
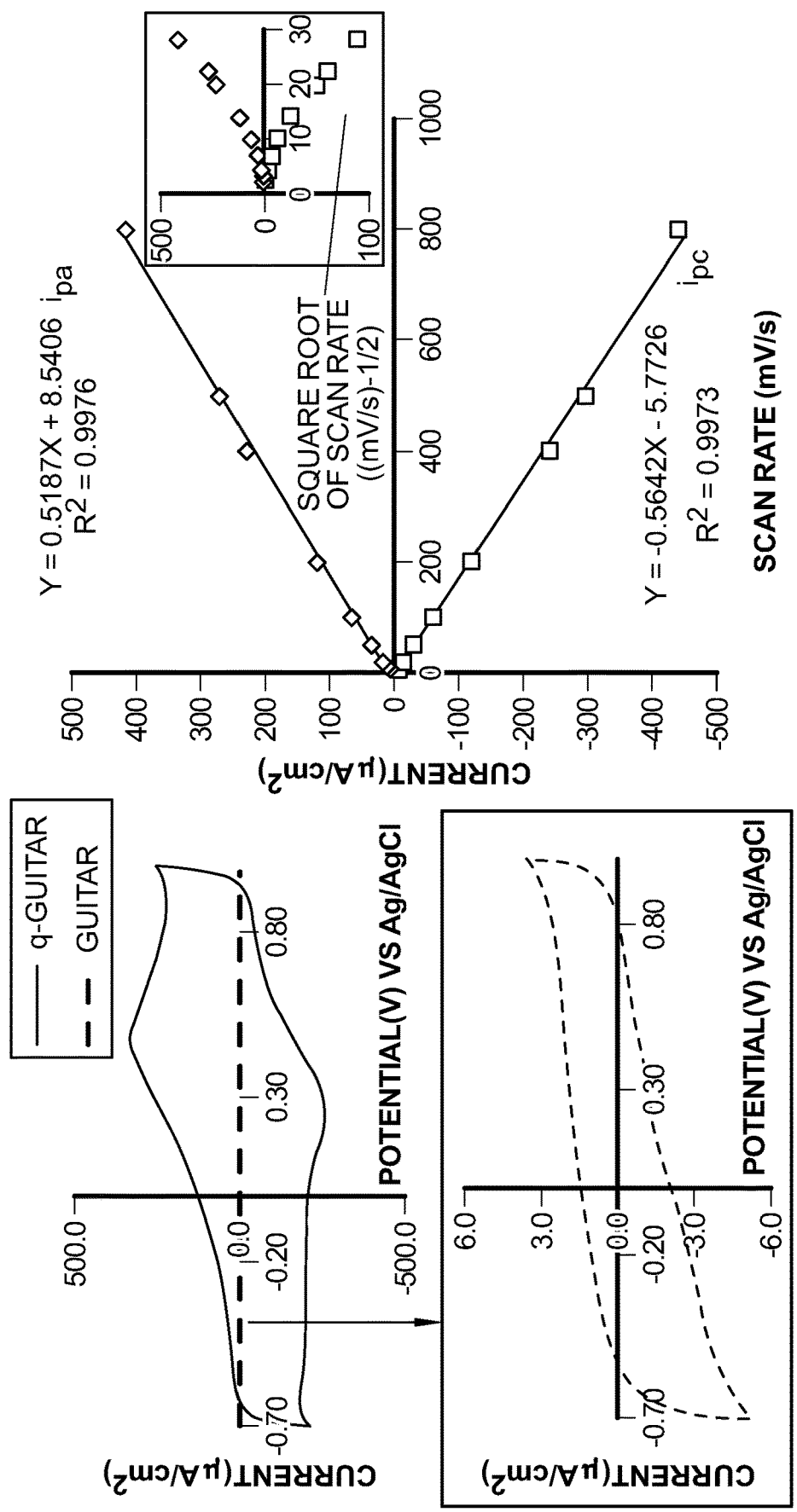
FIG. 7A is a graph of steady state Cyclic Voltammetry of q-pseudo-graphite (solid line) and pseudo-graphite (dashed line) in de-aerated 1M sulfuric acid at 50 mV/s (the shaded area indicated the charge integration used to calculate the quinoid surface coverage)
FIG. 7B is a graph of quinoid reduction and oxidation peak current collected from steady state CV linearly dependence on the scan rate (average of n=3) (the inserted figure shows the non-linear relationship between peak current and square root of the scan rate)

Post-modification cyclic voltammetric (CV) studies in 1 M H$_2$SO$_4$ are shown in FIG. 7. The steady-state CV of q-pseudo-graphite in FIG. 7a shows the reduction and oxidation of quinonoid/hydroquinonoid surface functional groups. The broadness of reduction and oxidation peaks indicates pH sensitive quinoid groups in a variety of chemical environments. The peak potentials (Ep) of this CV wave are 322 mV and 426 mV, respectively for the cathodic and anodic branches. Both the reduction and oxidation peak currents ($i_p$) were found to be linearly dependent on the scan rate, as seen in FIG. 7b. This is expected for surface bound redox-active functional groups. The below equation allows for the calculation of surface concentration from the CV wave.

$$Q = nFA\Gamma_0^*,$$

The variables n, F, A and $\Gamma_0^*$ represent the number of electron transferred, Faraday's constant, electrode area and quinoid surface concentration (mol/cm$^2$), respectively. Charge, Q is integrated from the shaded area in FIG. 7a. On the basal plane (BP) of q-pseudo-graphite, the concentration of quinoid species was found to be $2.7 \times 10^{-9}$ mol/cm$^2$, equivalent to 40% coverage relative to carbon on that surface. Electrochemical formation of quinoid groups on pseudo-graphite compare favorably with other attachment methods on graphite. In general, q-pseudo-graphite has relatively higher concentrations of quinoid when compared to graphitic materials ($7.8 \times 10^{-12}$ mol/cm$^2$ to $1.1 \times 10^{-9}$ mol/cm$^2$). Other examples possess such high surface concentrations ($3.6 \times 10^{-9}$ mol/cm$^2$ to $2 \times 10^{-8}$ mol/cm$^2$) of quinoid are edge-plane rich materials. There appear to be no other examples of quinoid modification on basal plane (BP) graphite in the literature. This indicates a unique chemical environment in BP-pseudo-graphite relative to BP-graphite. With such high quinoid coverage, the q-pseudo-graphite electrode produces a high square-wave voltammetric pH sensing signal (FIG. 10) relative to literature.

Figure 9:
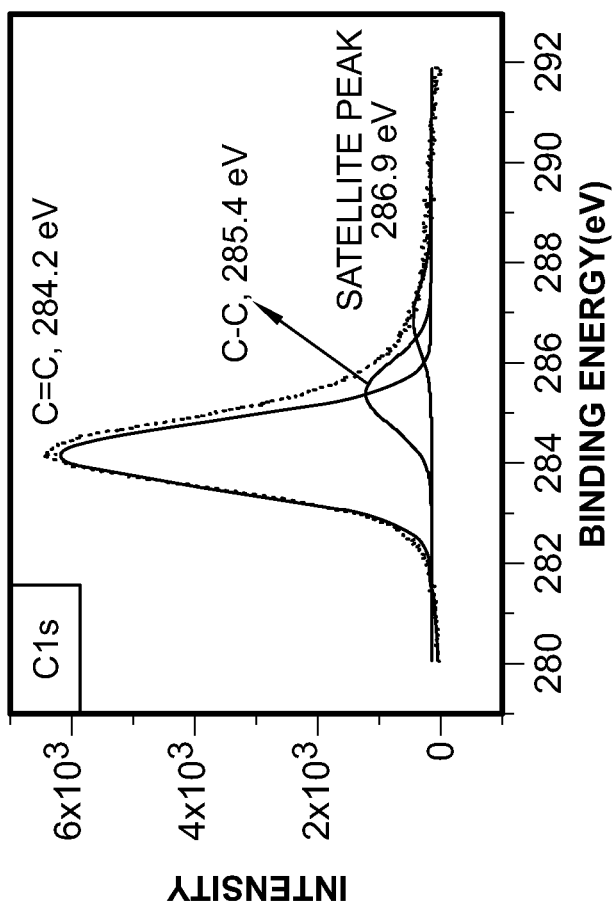
FIG. 9 includes graphs of x-ray photoelectron spectra and deconvolution of C1s and O1s peak of pristine pseudo-graphite and q-pseudo-graphite.
Figure 9:
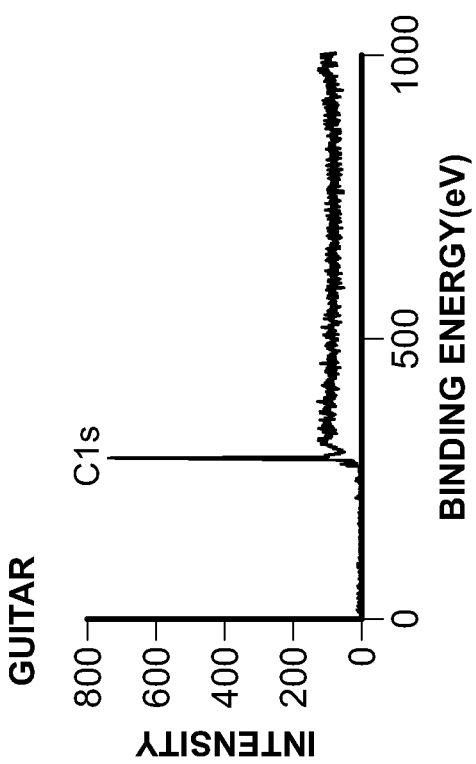
Figure 9:
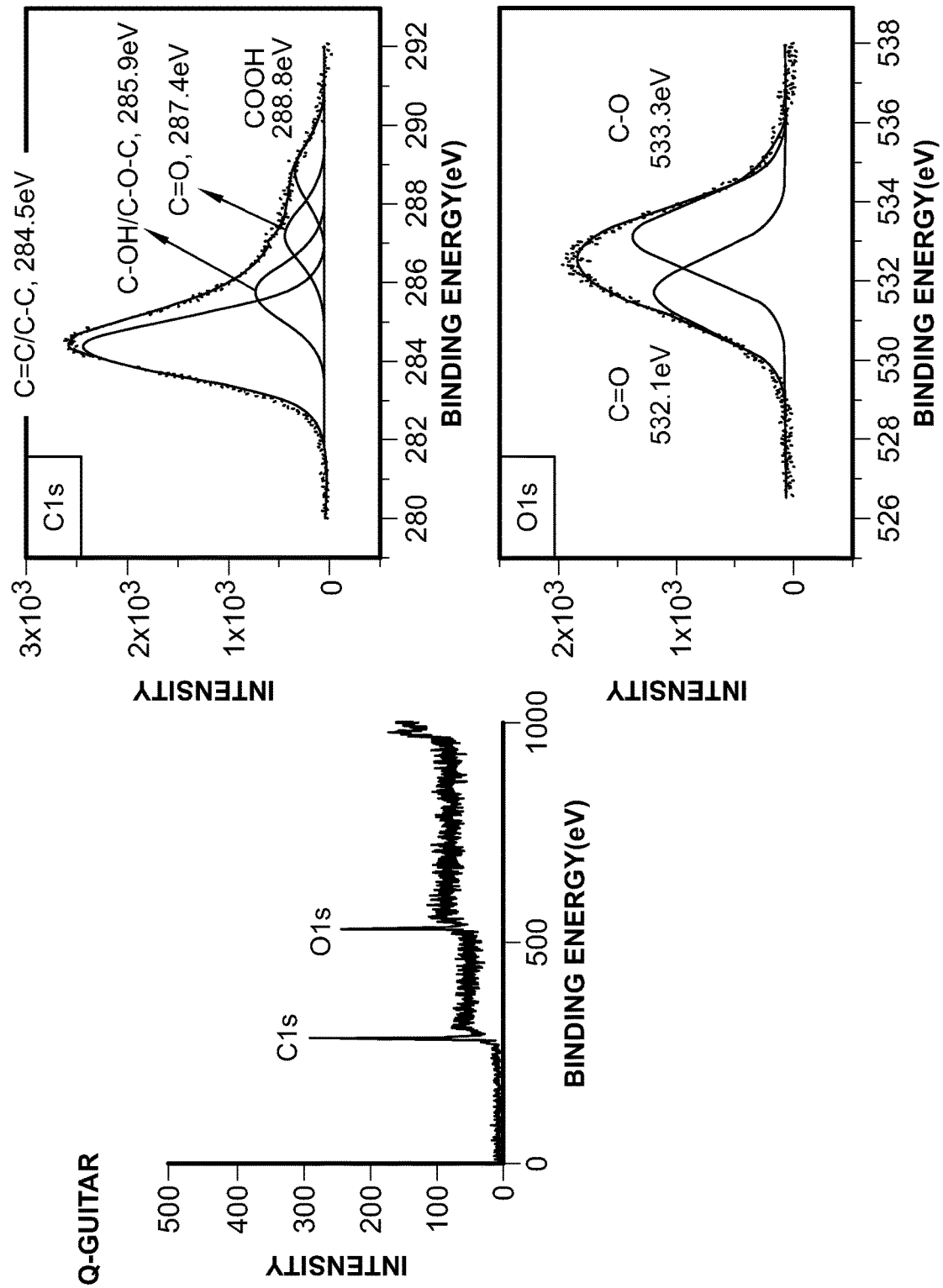

The wide scan XPS of q-pseudo-graphite in FIG. 9 reveals C 1s and O 1s peaks. The deconvolved C 1s peaks with their chemical assignments and relative abundances on pristine and q-pseudo-graphite of this study are summarized in FIG. 8 and compared with a previous work.

Figure 10:
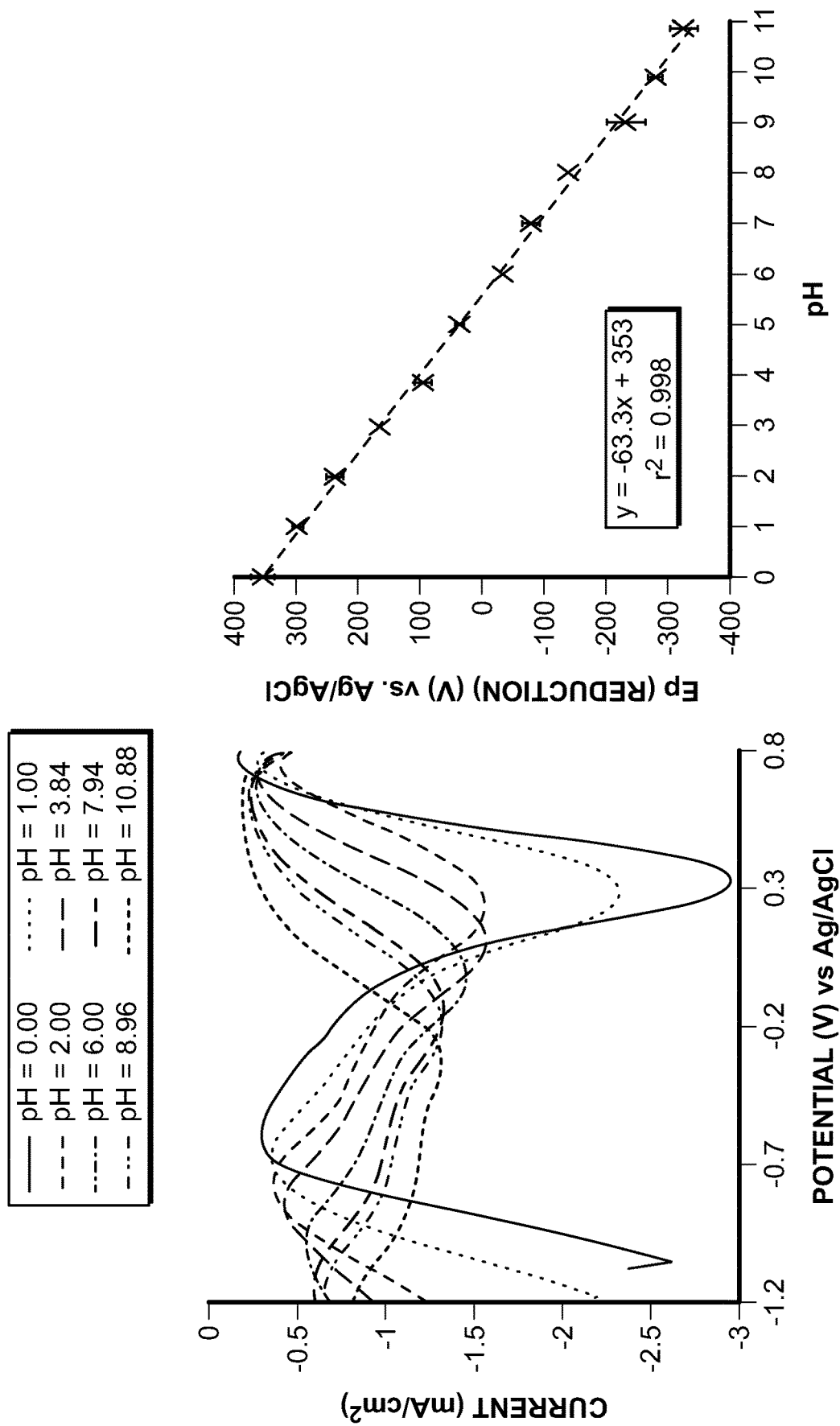
FIG. 10 includes a graph (left-hand side) representative of square wave voltammograms (SWVs) of q-pseudo-graphite as a function of pH, wherein all the SWVs were collected on the same electrode without re-activation, under aerobic conditions with 0.1 M $KNO_3$ supporting electrolyte and a graph (right-hand side) of the SWV reduction peak position (Ep) vs. pH, the error bars indicating standard deviation for 5 samples, wherein the slope is −63.3 mV/pH.

The electro-active surface oxygen content of q-pseudo-graphite (sum of the 285.9 eV and 287.4 eV peaks) is 26.6% are in relatively good agreement with the electrochemical measurements with the above-equation of 40%. The q-pseudo-graphite of a previous study had higher total oxygen content (sum of all oxygen involved peak component) of 41% as measured by XPS. The deconvolved O 1s peak of q-pseudo-graphite indicated two components: C=O at 532.1 eV (46.2%) and C—O at 533.2 eV (53.8%) (FIG. 9). It is notable that there was no peak that can be attributed to intercalated water (534.7 eV). In contrast, during anodization other graphitic electrodes undergo electrolyte intercalation at the edge plane, step defects and grain boundaries. The relative lack of intercalation in pseudo-graphite is distinctive and may be related to the pseudo-graphite's resistance to corrosion relative to other graphitic materials The pH response of q-pseudo-graphite was measured by square wave voltammetry (SWV). This is due to its sensitivity relative to other voltammetric techniques. Quinoid reduction peaks from pH 0 to 11 are shown in FIG. 10. The buffers for this study were measured to 0.01 pH units with a calibrated glass pH electrode. It is apparent that the peak current signal decreases with the increasing pH value. This effect has also been observed in the literature with other quinoid modified graphite materials with a variety of hypotheses. The variation in SWV peak potentials with pH is expected through FIG. 5. That plot is shown in FIG. 10b. The average slope of this shift is −63.3 mV/pH with a standard deviation of ±1.1 mV/pH and an intercept of 353±6 mV for five samples. The slope is near Nernstian in behavior (59.2 mV/pH).

The linear sensing range of q-pseudo-graphite electrodes was established from pH 0 to 11. At pH −1.0 (10 M HNO$_3$) and below, no current response was observed for the quinoid group reduction. Approximately 50% of the q-pseudo-graphite electrodes (20 samples) are successful at sensing pH −0.58 (3.8M HNO$_3$). At pH 0, all 20 sensors were effective. For the upper limit, pH 12 and above are not possible as the q-pseudo-graphite undergoes oxide layer exfoliation subjected to the voltammetric scan. This has also been observed in anodized glassy carbon electrodes. In some embodiments, exfoliation is suppressed in pseudo-graphite-composite electrodes, thereby providing attractive properties as pH sensors. At pH 11, pH sensing is possible for 2 SWV measurements before an observed shift in that peak potential. At pH 10, 7 measurements are possible without that peak potential shift. At pH 9 the electrode was stable for more than 20 measurements. Overall this pH sensor demonstrates very good stability over the pH range of 0-9. This sensor is very competitive with the literature in terms of need for reactivation between voltammetric runs, overall stability and pH range.

Two possible interferences were examined. These include the classical interferences with alkali metals on the glass pH membrane and the oxygen reduction reaction (ORR) in the below equation:

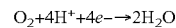

$$O_2 + 4H^+ + 4e^- \rightarrow 2H_2O$$

Figure 11:
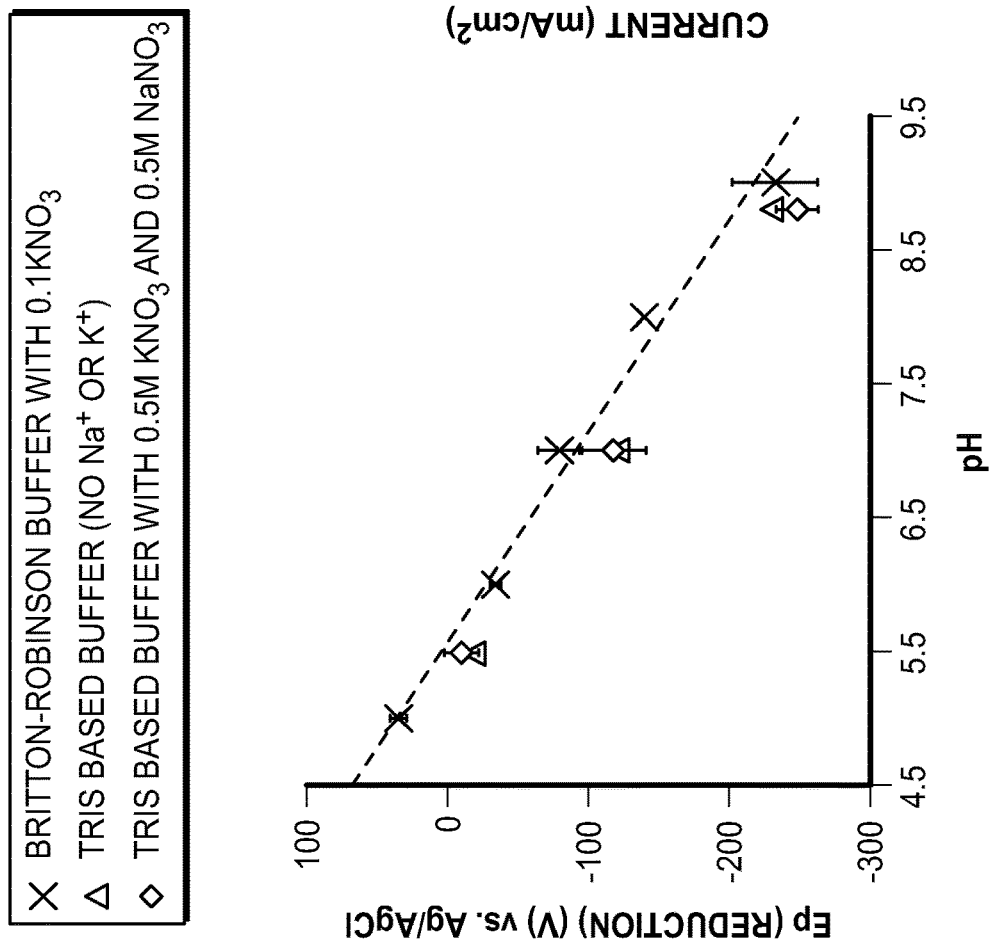
FIG. 11 is a graph of the response of the q-pseudo-graphite pH sensor in the presence and absence of $K^+$ and $Na^+$, wherein the response in the Britton-Robinson buffer (x) is taken from FIG. 10b and the response in the TRIS buffer were collected in the absence (Δ) and in the presence (♦) of 0.5M $KNO_3$ and 0.5M $NaNO_3$, wherein black error bars indicate the standard deviation of five electrodes, and red error bars is that of four, wherein the responses in all buffers were not significantly different subjected to 99.5% confidence interval indicating no interferences from $K^+$ and $Na^+$.

The classical glass pH electrode suffers from Na$^+$ and K$^+$ interferences through competing equilibria with H$^+$. There is at least one report that indicates this possibility with voltammetry of quinoid derivatives. To examine this possibility, TRIS buffer was used in place of the Britton-Robinson buffer, as it is free of alkali metal ions. As shown in FIG. 11, the peak position in the absence or the presence of 0.5 M NaNO$_3$ and 0.5 M KNO$_3$ did not significantly differ from the least squares fit line of FIG. 10b. These were not significantly different as subjected to the Student's t-test at 99.5% confidence interval. This indicates that Na$^+$ and K$^+$ do not interfere with this sensor.

Figure 12:
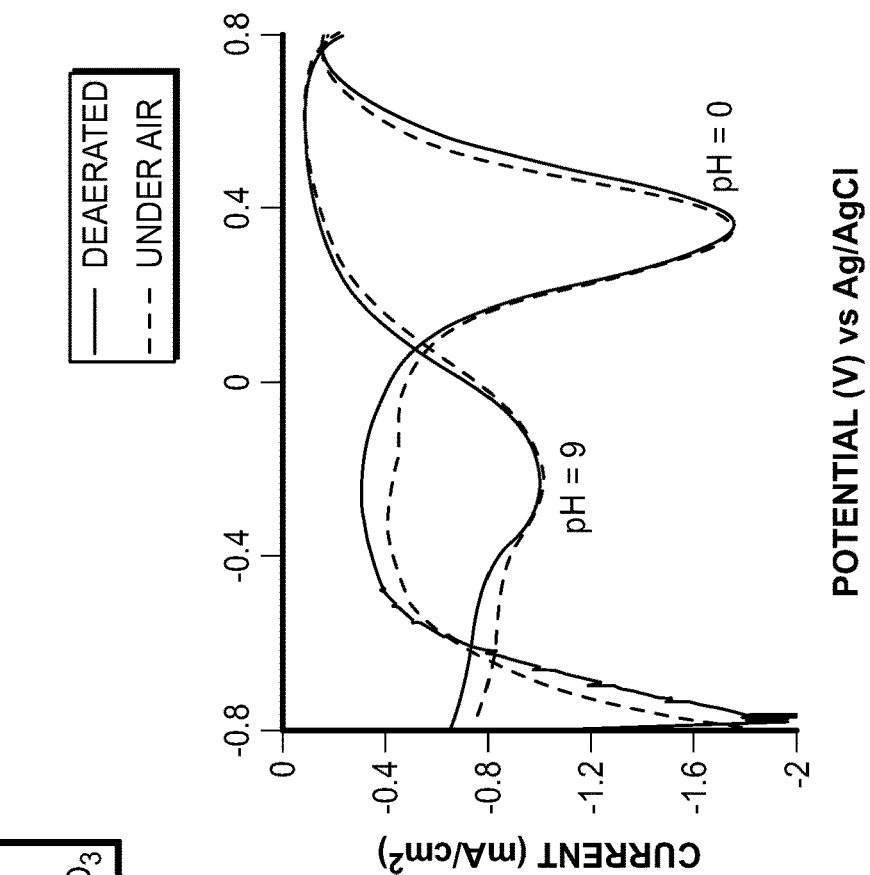
FIG. 12 is a graph of square wave voltammetry of q-pseudo-graphite in 1M $HNO_3$ (pH=O) and B-R buffer (pH=9) under air (dashed line) and after deaeration (solid line)

The ORR was also examined as possible interference. As on many carbon materials, this reaction proceeds in the same potential range for voltammetric pH sensing. Furthermore, the need for O2 removal would impede its use as a practical sensor. The voltammetric response of q-pseudo-graphite at pH 0 and 9 under air and after deaeration with N$_2$ purging are shown in FIG. 12. As evident in the voltammograms, the peak potentials (Ep) are not affected by the presence of dissolved O$_2$. There is minor contribution to the overall SWV current by the ORR but they occur at potentials more negative to the peak potentials.

Features of the presently disclosed sensors include ease of preparation, good linear range of pH 0-11, and relative durability. Additional attributes include the ease and speed at which the pH sensitive quinoid groups are formed on the basal plane of pseudo-graphite. It is noteworthy that forming these groups by anodization is difficult or even impossible on basal plane of other carbon sp$^2$ allotropes due to corrosive processes. The pseudo-graphite stands unique in this characteristic. The concentration of the quinoid groups on BP of q-pseudo-graphite is about the same as electrochemically produced moieties of edge plane graphite based sensors. FIG. 13 highlights the sensing performance of the q-pseudo-graphite relative to the literature. In comparison to the glass pH electrode it has a similar linear range with slightly better acidic performance with reliable response down to pH 0. This was only observed with a few other carbon based electrode systems. The overall pH sensing range is very competitive with other sensors and exceeds other anodized carbon electrodes. The combination of these attributes makes q-pseudo-graphite a competitive pH sensor. Furthermore, this sensor could be miniaturized and screen-printed pseudo-graphite particles designs could be used for semi-disposable test strip electrode systems.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A method comprising:
    coating a pseudo-graphite material onto a surface of an electrode substrate to produce an electrode having a pseudo-graphite surface, wherein the pseudo-graphite material does not produce a peak corresponding to intercalated water when the pseudo-graphite material is analyzed by X-ray photoelectron spectroscopy,
    attaching oxygen-based chemistries to the pseudo-graphite surface to enhance the electrode for pH measurement, and
    exposing the pseudo-graphite surface to a sample to measure a pH of the sample.

2. The method of claim 1, wherein attaching oxygen-based chemistries to the pseudo-graphite surface comprises attaching the oxygen-based chemicals through in-situ oxidation.

3. The method of claim 1, wherein attaching oxygen-based chemistries to the pseudo-graphite surface comprises applying an oxidizing electrical potential to the pseudo-graphite surface.

4. The method of claim 1, further comprising measuring pH with the electrode through at least one of square wave voltammetry or sweep voltammetry.

5. The method of claim 1, further comprising measuring pH with the electrode through open circuit potential.

6. The method of claim 1, further comprising measuring pH with the electrode in conjunction with localized pH modulation.

7. The method of claim 1, wherein the pseudo-graphite material has a corrosion resistance greater than graphitic materials.

8. The method of claim 1, wherein the pseudo-graphite material of the pseudo-graphite surface has a basal plane and an edge plane, and wherein the oxygen-based chemistries are attached to the basal plane.

9. The method of claim 1, wherein attaching oxygen-based chemistry comprises contacting the pseudo-graphite surface with a solution comprising peroxides, ozone, chlorate, Caro's acid, piranha solution, Hummer's solution, meta-chloroperbenzoic acid, sulfuric acid, or $Na_2SO_4$.

10. The method of claim 1, wherein the electrode is configured to measure pH in a range from 0 to at least 11.

11. A sensor comprising:
    an electrode,
    an electrical source to supply at least one of a current or voltage to the electrode, and
    a measurement circuit to measure a resultant signal from the electrode,
    wherein the electrode comprises (i) an electrode substrate with a surface and (ii) a pseudo-graphite material comprising oxygen-based chemistries coated onto the surface of the electrode substrate to produce a pseudo-graphite surface, wherein the pseudo-graphite material does not produce a peak corresponding to intercalated water when the pseudo-graphite material is analyzed by X-ray photoelectron spectroscopy.

12. The sensor of claim 11, wherein the pseudo-graphite material of the pseudo-graphite surface has a basal plane and an edge plane, and wherein the oxygen-based chemistries are attached to the basal plane.

13. The sensor of claim 11, wherein the electrode is configured to measure pH in a range from 0 to at least 11.

14. An electrode comprising:
    an electrode substrate with a surface, and
    a pseudo-graphite material comprising oxygen-based chemistries coated onto the surface of the electrode substrate to produce a pseudo-graphite surface for pH measurement,
    wherein the pseudo-graphite material does not produce a peak corresponding to intercalated water when the pseudo-graphite material is analyzed by X-ray photoelectron spectroscopy.

15. The electrode of claim 14, wherein the oxygen-based chemistries are attached through in-situ oxidation.

16. The electrode of claim 14, wherein an oxidizing electrical potential is applied to the pseudo-graphite surface to attach the oxygen-based chemistries.

17. The electrode of claim 14, wherein the pseudo-graphite material has a corrosion resistance greater than graphitic materials.

18. The electrode of claim 14, wherein the pseudo-graphite material of the pseudo-graphite surface has a basal plane and an edge plane, and wherein the oxygen-based chemistries are attached to the basal plane.

19. The electrode of claim 14, wherein the electrode is configured to measure pH in a range from 0 to at least 11.

20. The electrode of claim 14, wherein the electrode is configured to measure pH in a range from 0 to at least 9.

* * * * *